July 19, 1966 W. I. GRANT 3,261,172
COOLANT SYSTEM FOR HERMETICALLY SEALED MOTOR
Filed Nov. 12, 1963 2 Sheets-Sheet 1

INVENTOR.
WHITNEY I. GRANT
BY
Lieber & Nilles
ATTORNEYS

INVENTOR.
WHITNEY I. GRANT
BY
*Lieber & Nilles*
ATTORNEYS

United States Patent Office 3,261,172
Patented July 19, 1966

1

3,261,172
COOLANT SYSTEM FOR HERMETICALLY
SEALED MOTOR
Whitney I. Grant, Muskego, Wis., assignor to Vilter
Manufacturing Corporation, Milwaukee, Wis., a corporation of Wisconsin
Filed Nov. 12, 1963, Ser. No. 323,012
13 Claims. (Cl. 62—117)

This invention relates to the cooling of hermetically sealed motors, and more particularly to the cooling of hermetically sealed motors in a refrigerating system wherein the coolant is controllably supplied from the refrigerating system by a thermal responsive element located within the motor casing and directly subjected to motor temperature.

A primary object of the invention is to cool a hermetically sealed motor of a refrigerating system in an improved thermal responsive manner.

Hermetic motor cooling in refrigeration systems is shown, for example, in U.S. Patent No. 2,776,542 wherein a thermal responsive valve controls the passage of condensed refrigerant in heat exchange relationship with the compressor motor in a refrigerating system. In this prior system, the valve controls the amount of condensed refrigerant conducted through the motor according to the temperature of the compressed refrigerant in the casing. Furthermore, the thermal responsive element for controlling the valve is located inside a hermetic casing directly in the flow of heated compressor discharge gas being delivered to the condenser, and the thermal responsive element is sensitive to the superheat of the heated gas.

The prior art also shows various other systems for utilizing either gaseous or liquid refrigerant for the cooling of hermetically sealed motors in a refrigerating system. As examples, such patents are No. 1,890,205; No. 2,247,950; and No. 2,249,882. However, none of these patents disclose the effective motor temperature detection and coolant control of the present invention; and as far as is known, the prior art does not directly sense the motor temperature for controlling the supply of coolant to the motor.

In the preferred embodiment of the present invention, a temperature responsive element is located within the motor at a location where the motor is most likely to reach a high heating point during operation, and a coolant is controlled by such element to maintain the motor temperature at a point of optimum efficiency of the motor without appreciably affecting compressor efficiency.

It is therefore another object of this invention to provide an improved system of cooling a hermetically sealed motor in a more positive and efficient manner which obviates the aforesaid disadvantages and objections of prior devices.

Another object of the invention is to provide an improved motor temperature sensing system for controlling coolant for a hermetically sealed motor in a refrigeration system.

Still another object of this invention is to provide an improved motor temperature sensing system for controlling fluid coolant flow to cool a hermetically sealed motor.

An additional object of this invention is to provide an improved motor temperature sensing element and to most advantageously locate the same for most effective control of a coolant for the motor.

These and other objects and advantages of the invention will become apparent from the following detailed description.

A clear conception of the several features constituting the present invention may be had by referring to the drawings accompanying and forming a part of this specification, wherein like reference characters designate the same or similar parts in the various views.

Figure 1:
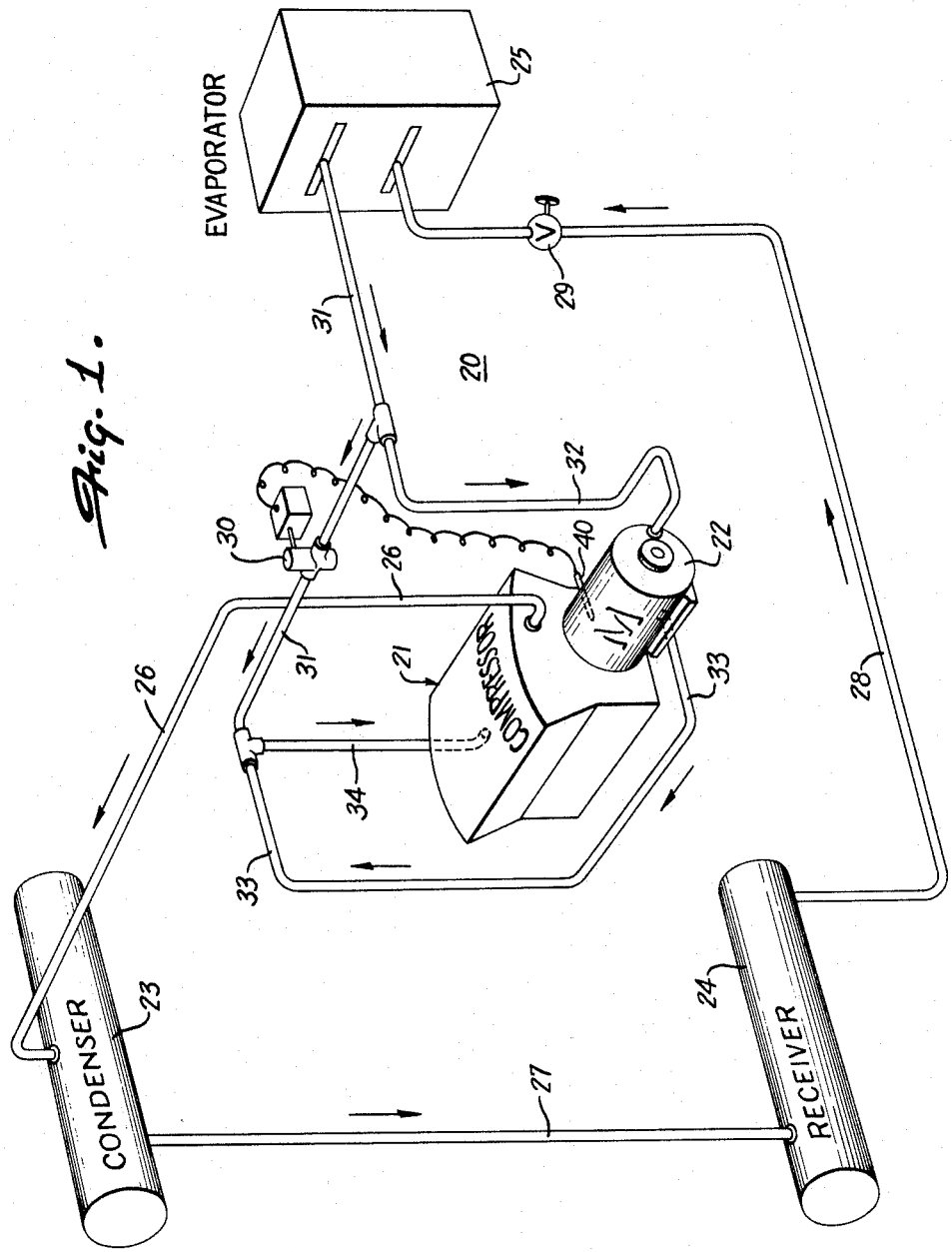
FIG. 1 is a schematic illustration of a refrigeration system embodying the invention.

Referring now to FIG. 1 wherein a refrigeration system 20 is shown comprising a compressor 21 driven by a motor 22, a condenser 23, a liquid refrigerant receiver 24, and an evaporator 25 interconnected in the system by appropriate conduits.

The compressor 21 compresses refrigerant gas for communication through conduit 26 to the condenser 23. The condensed refrigerant flows from condenser 23 as a high pressure liquid through conduit 27 to the liquid refrigerant receiver 24. The liquid refrigerant is carried by conduit 28 through pressure reducing valve 29 to the evaporator 25 where, as is well known, the refrigerant liquid is evaporated and the resulting refrigerant gas returns to the compressor 21 via conduit 31, in which is located a thermally responsive valve 30, well known in the art. The valve 30 in response to motor 22 temperature regulates the amount of refrigerant gas that is circulated through conduit 32 to the interior of the casing of motor 22 for the cooling thereof. After passing through the motor 22, the coolant gas flows through by-pass conduit 33 to the compressor suction conduit 34. The amount of coolant fluid circulated through the motor 22 is regulated by the action of temperature sensing element 40 located in motor 22 (see FIG. 3) to control valve 30. The valve 30, as actuated in accordance with sensed motor temperature at the point of highest expected motor temperature, reduces the refrigerant fluid pressure between valve 30 and the compressor 21. The reduced pressure is effective in by-pass conduit 33 to motor 22 to provide a pressure differential to permit fluid flow through conduit 32.

As the pressure varies in accordance with valve action occasioned by sensing element 40, the amount of refrigerant fluid circulated through the motor 22 will be thus controlled. The response of sensing element 40 is determined so that no fluid flows through the motor until a predetermined maximum allowable motor operating temperature is reached. This allows a motor operation at amperage loads considerably above the ampere rating of the motor as long as the temperature sensing system provides a sufficient flow of coolant fluid through the motor to provide the requisite cooling thereof.

Figure 2:
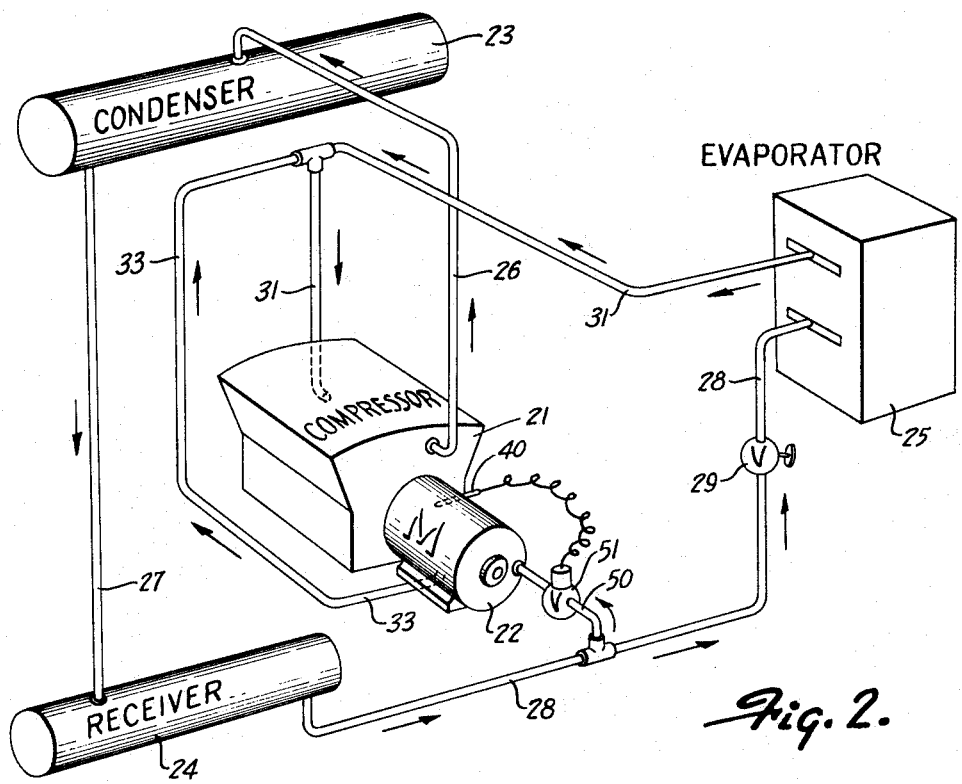
FIG. 2 is a schematic illustration of a modification of the invention in a refrigerating system.
Figure 3:
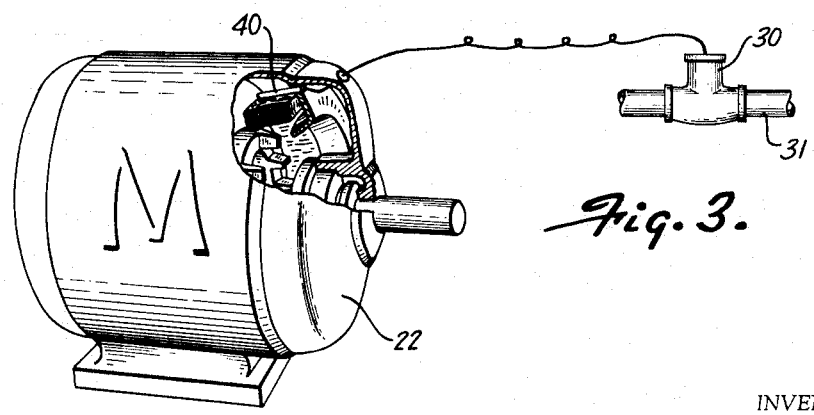
FIG. 3 is an enlarged partial section of a motor and temperature sensing means of FIGS. 1 and 2.

Reference is now made to FIG. 2 wherein a modification of the thermal responsive system for cooling motor 22 is schematically illustrated. As hereinabove described, the compressor 21 discharges high pressure refrigerant fluid to condenser 23, and liquid refrigeration is delivered to receiver 24 via conduit 27. From receiver 24 the liquid refrigerant under pressure is communicated through pressure reducing valve 29 to the evaporator 25 by conduit 28. From the evaporator 25, refrigerant gas is carried to the compressor 21 by conduit 31. In FIG. 2, it should be noted that a conduit 50 connects conduit 28 to the housing of motor 22. A pressure reducing valve 51, well known in the art, is located in conduit 50 and is actuated to admit a variable amount of liquid refrigerant to motor 22 in accordance with motor temperature sensed by sensing element 40. The sensing element 40 is located interiorly of motor 22 as shown in FIG. 3 and as described hereinabove. The refrigerant entering the motor through conduit 50 cools the motor in accordance with valve 51 as controlled by element 40, and refrigerant gas is carried from the motor 22 by conduit 33 to compressor suction at conduit 31.

Thus, the latent heat of vaporization of the liquid refrigerant from conduit 50 is used in cooling motor 22. Further, the liquid refrigerant is easily communicated to motor 22 by the pressure existing in conduit 28, and no additional pressure source is required for the liquid refrigerant. It is believed that efficient cooling of the motor can be accomplished with a given amount of refrigerant by taking advantage of the latent heat of vaporization of the liquid refrigerant. In addition, there is no reduction of the suction pressure at the compressor and thus the compression ratio for the compressor does not become too great for efficient compressor action.

In the embodiments of FIGS. 1 and 2 a by-pass conduit 33 is shown that is external of the compressor 21. However, it is not intended as a limitation, as it is possible that refrigerant gas may pass directly into the compressor housing from the end of the motor adjacent the compressor.

Various modes of carrying out the invention are contemplated as being within the scope of the following claims particularly pointing out and distinctly claiming the subject matter which is regarded as the invention.

I claim:
1. A cooling system for a hermetically sealed motor in a refrigerating system having a compressor driven by said motor, a condenser, first conduit means connecting said condenser with an evaporator, second conduit means connecting said evaporator with the suction side of said compressor, means located interiorly of said motor in direct heat exchange relation with the motor winding for sensing motor temperature, third conduit means connecting said first conduit means with said motor for supplying liquid refrigerant thereto for the cooling thereof, and a valve in said third conduit actuated by said motor temperature sensing means for regulating the supply of liquid refrigerant to said motor in response to motor temperature.

2. A thermal responsive system for cooling a hermetically sealed motor in a refrigerating system wherein said motor drives a compressor in said refrigerating system, a first conduit for communicating refrigerant fluid to said compressor from an evaporator in said refrigerating system, a second conduit for communicating refrigerant fluid to said hermetically sealed motor for cooling thereof, a thermal responsive valve located in said first conduit for regulating the amount of refrigerant fluid passing through said first and second conduits, and a motor temperature sensing element located in said motor in contact with the motor winding and connected to said thermal responsive valve means to actuate said valve in accordance with sensed motor temperature.

3. The cooling system of claim 1 wherein a by-pass conduit is connected between the motor and the compressor for conducting refrigerant used in cooling said motor back to the compressor.

4. The thermal responsive system of claim 2 wherein a by-pass conduit is connected between the motor and the compressor for conducting refrigerant used in cooling said motor back to the compressor.

5. A system for controlling cooling of a hermetically sealed motor in a refrigerating system wherein the motor drives a compressor, conduit means for conducting refrigerant to said compressor and to said motor, refrigerant flow regulating means located in said conduit means, and a sensing element located within said motor in heat exchange relation with the motor winding to actuate said flow regulating means to proportion the flow of refrigerant fluid between said compressor and said hermetically sealed motor in accordance with motor conditions sensed by said sensing element.

6. The cooling control system of claim 5 wherein said refrigerant flow regulating means regulates flow of refrigerant gas to said motor to cool said motor in response to temperature sensed by said sensing element.

7. The cooling control system of claim 5 wherein said refrigerant flow regulating means regulates flow of refrigerant liquid to said motor to cool said motor by latent heat of vaporization in response to motor temperature sensed by said sensing element.

8. In a refrigerating system, a compressor, a hermetic motor for driving said compressor, a condenser, an evaporator, conduit means connecting said compressor, condenser, evaporator and motor, means located interiorly of said motor in heat exchange relation with the motor winding for sensing motor temperature, and valve means in said conduit means actuated by said motor temperature sensing means for controlling flow of refrigerant to said motor through said conduit means directly in response to motor temperature.

9. A refrigerating system according to claim 8, wherein the value means for controlling flow of refrigerant to the motor is interposed in the conduit between the evaporator and the compressor.

10. A refrigerating system according to claim 8, wherein the valve means for controlling flow of refrigerant to the motor is interposed in the conduit between the condenser and the evaporator.

11. The method of controlling cooling of a hermetically sealed motor driving a compressor in a refrigerating system, which method comprises, conducting refrigerant from the system to both the compressor and the motor, and regulating the proportionate flow of refrigerant to the compressor and the motor directly in accordance with the temperature conditions existing within the motor.

12. The method of claim 11, wherein the refrigerant is conducted to both the compressor and the motor in a gaseous state.

13. The method of claim 11, wherein the refrigerant is conducted to the compressor in a gaseous state and the refrigerant is conducted to the motor in a liquid state.

References Cited by the Examiner
UNITED STATES PATENTS

| | | | |
|---|---|---|---|
| 2,184,285 | 12/1939 | Codling | 62—505 X |
| 2,746,269 | 5/1956 | Moody | 62—505 |
| 2,770,106 | 11/1956 | Moody | 62—505 |
| 2,793,506 | 5/1957 | Moody | 62—505 |
| 3,146,605 | 9/1964 | Rachfal | 62—505 X |

MEYER PERLIN, *Primary Examiner.*